United States Patent
Sweeney

[15] 3,699,157
[45] Oct. 17, 1972

[54] COLOR REDUCTION OF OLEFIN SULFONATES

[72] Inventor: William A. Sweeney, Larkspur, Calif.

[73] Assignee: Chevron Research Company, San Francisco, Calif.

[22] Filed: April 6, 1970

[21] Appl. No.: 26,172

[52] U.S. Cl. .................................................260/513 R
[51] Int. Cl. .................................................C07c 143/16
[58] Field of Search .....................................260/513 R

[56] References Cited

UNITED STATES PATENTS 3,481,849  12/1969  Beermann et al......260/513 R
3,492,343  1/1970   Garner et al..........260/513 R

*Primary Examiner*—Daniel D. Horwitz
*Attorney*—J. A. Buchanan, Jr., John Stoner, Jr., G. F. Magdeburger and D. L. Hagmann

[57] ABSTRACT

Olefin sulfonates of improved color are obtained by contacting the olefin, prior to sulfonation, with molecular oxygen at an elevated temperature.

5 Claims, No Drawings

COLOR REDUCTION OF OLEFIN SULFONATES

FIELD OF INVENTION

This invention relates to a method for the production of olefin sulfonates having improved color.

PRIOR ART

It is known (see, for example U.S. Pat. No. 3,444,191) to produce sulfonates by the reaction of dilute sulfur trioxide with a non-aromatic hydrocarbon containing a single olefinic functional group, that is, a single carbon-carbon double bond in a reaction occurring in the liquid phase. A problem common to "thermal olefins," i.e., olefins obtained by chemical, catalytic or non-catalytic processing of suitable feeds at an elevated temperature i.e., in the range 150°C. to 600°C.) is that, in general, by-product impurities are produced as a result of the high temperatures employed. These impurities upon contact with sulfur trioxide in an olefin sulfonation reaction yield undesirable color bodies.

THE INVENTION

The Klett color value of a sulfonate produced by the sulfonation of non-aromatic thermal olefin with dilute sulfur trioxide is substantially reduced by a treatment prior to the sulfonation in which the olefin in the liquid phase is contacted with oxygen gas at a temperature in the range from about 50°C. to 200°C. for a period in the range from about 0.1 to 120 hours.

By "dilute sulfur trioxide," as used herein, is meant by definition sulfur trioxide gas in admixture with an inert gas or sulfur trioxide dissolved in an inert solvent. In either case the sulfur trioxide is a minor fraction of the mixture and comprises less than about 20 weight percent of the whole mixture.

PREFERRED EMBODIMENT

An olefin sulfonate having improved Klett color value is prepared from an alpha-olefin fraction obtained by the vapor phase non-catalytic cracking of a paraffinic hydrocarbon feed at temperature of about 590°C. The olefin is the $C_{15}$ to $C_{18}$ cut obtained from the fractional distillation of the crude olefin product obtained in the cracking reaction. While maintaining the olefin at a temperature of about 100°C., air is introduced into the olefin for a period of about one day.

The treated olefin is then sulfonated by introducing about a 95-5 (weight) air-sulfur trioxide gas mixture into the olefin while maintaining the temperature of the mixture in the range 25-75°C. Sufficient caustic to neutralize the sulfonic acid and to saponify the sultone present in the resulting product (usually amounts to one mol of caustic per mol of sulfur trioxide reacted) is added to the product mixture which is then heated to about 150°C. for a period sufficient to complete the saponification, usually about 10–30 minutes. The resulting sulfonate has a Klett color value which is 20 to 40 percent less than the value for the untreated olefin.

Olefinic hydrocarbons which have been subjected to elevated temperature, i.e., above about 150°C. and particularly above about 300°C. (thermal olefins), in the absence of purification treatments, in general, contain reactive impurities which interact with sulfur trioxide to yield color bodies (chromophoric groups). These olefins are improved by the present treatment and, in general, have a carbon atom content of at least about eight carbon atoms and as a practical matter less than about 24.

Representative mono-olefinic hydrocarbons suitable for use in the process herein and which are benefitted thereby include olefins derived under elevated reaction conditions from thermal cracking of paraffin mixtures, or petroleum distillate fractions, both by catalyzed and uncatalyzed reactions, those derived from the catalyzed dehydrohalogenation of saturated hydrocarbon halides; from the pyrolysis of esters; and the like, that is non-aromatic mono-olefinic hydrocarbons of the acyclic, and cyclic molecular structures and combinations thereof. The n-alkene mono-olefinic hydrocarbons obtained from the thermal cracking of paraffinic hydrocarbon feeds are preferred for use in the instant process.

Temperatures suitable for use in the treatment are broadly in the range 50°C. to 200°C. The length of the treatment varies depending upon the temperature and the amount of the impurities in the olefin. At about 80°C. a period of 2–5 days is usually satisfactory, while at about 200°C. a period of 0.1–1 hour is ordinarily sufficient. The time which is satisfactory for treatment at an intermediate temperature is, of course, between these extremes.

Oxygen and oxygen-containing inert gases, particularly air, are satisfactory for use herein. Preferably the introduction of the gas into the olefin is in the finely dispersed form.

The following detailed examples illustrate the valuable results obtained by the present process. As many variations of reactants and reaction conditions are within the scope of the invention, the examples are illustrative only and the invention is not intended to be limited to the particular materials or reaction conditions recited therein.

In Examples 1–3 a series of $C_{15}$–$C_{18}$ cracked wax olefins containing different amounts of color body precursor compounds, i.e., impurities, were maintained at 80°C. and finely dispersed air was introduced into the liquid body of olefin. The treated and untreated olefin feeds were sulfonated, saponified and bleached in parallel operations under comparable conditions with the results as listed below.

Effect of Air Blowing α-Olefins on Color of Sulfonate

| Example No. | Feed | Olefin Treatment | Before Bleach (20 mm Cell) | After Bleach[1] (40 mm Cell) |
|---|---|---|---|---|
| 1 | A | None | 550 | 246 |
| 1a | A | Air Blown | 415 | 200 |
| 2 | B | None | 580 | 278 |
| 2a | B | Air Blown [3 days] | 465 | 204 |
| 2b | B | Air Blown [6 days] | 440 | 195 |
| 3 | C | None | 760 | 340 |
| 3a | C | Air Blown [3 days] | 520 | 248 |
| 3b | C | Air Blown [6 days] | 500 | 265 |

(1) 3% NaOCl, 50°C., 1 hr.

The foregoing examples demonstrate that the pretreatment of a thermal olefin with molecular oxygen is an effective means for the reduction of the Klett color value of a sulfonate prepared by the reaction of dilute sulfur trioxide with the olefin.

It will be further understood that variations and modifications to the foregoing process may be made by those skilled in the art without departing from the spirit and scope of the invention.

I claim:

1. In the process for the production of a sulfonate by the reaction of dilute sulfur trioxide with an alpha olefin obtained by the vapor phase non-catalytic cracking of a paraffinic hydrocarbon feed at a temperature of about 590°C., said olefin having a carbon atom content in the range from about eight to 24, and said sulfonation reaction being effected at a temperature in the range from about −50 to 120°C., the improvement which comprises pretreating the olefin by maintaining it in the liquid phase at a temperature of about 100°C. and in contact with air for a period of about 1 day.

2. In the process for the production of a sulfonate by the reaction of dilute sulfur trioxide with an alpha olefin obtained by the vapor phase non-catalytic cracking of a paraffinic hydrocarbon feed, said olefin having a carbon atom content in the range from about eight of 24, said reaction being effected at a temperature in range from about −50 to 120°C., and said olefin having been subjected to an elevated temperature above about 150°C., the improvement which comprises pretreating the olefin by maintaining it in the liquid phase at a temperature in the range from about 50°C. to 200°C. and in contact with a molecular oxygen containing gas for a period in the range from about 0.1 to 120 hours.

3. The process as in claim 2 further characterized in that the pretreating temperature is about 100°C. and in that the gas is air.

4. In the process for the production of a sulfonate by the reaction of dilute sulfur trioxide with an olefin having a carbon atom content in the range from about eight to 24, said reaction being effected at a temperature in the range from about −50 to 120°C., said olefin having been subjected to an elevated temperature above about 150°C., and said olefin being selected from the group consisting of non-aromatic mono-olefinic hydrocarbons of the acyclic and cyclic molecular structures and combinations of acyclic and cyclic molecular structures, the improvement which comprises pretreating the olefin by maintaining it in the liquid phase at a temperature in the range from about 50°C. to 200°C. and in contact with a molecular oxygen containing gas for a period in the range from about 0.1 to 120 hours.

5. The process as in claim 4 further characterized in that the pretreating temperature is about 100°C. and in that the gas is air.

* * * * *